Feb. 10, 1953  L. A. TROFIMOV  2,628,341
ELECTRIC REGULATOR
Filed June 12, 1948  5 Sheets-Sheet 1

INVENTOR.
Lev A. Trofimov
BY Harry R. Canfield
ATTORNEY

INVENTOR.
Lev A. Trofimov
BY Harry R. Canfield
ATTORNEY

Patented Feb. 10, 1953

2,628,341

UNITED STATES PATENT OFFICE 2,628,341

ELECTRIC REGULATOR

Lev A. Trofimov, Willoughby, Ohio

Application June 12, 1948, Serial No. 32,626

3 Claims. (Cl. 323—43.5)

This invention relates to electric controllers or regulators by which an electrical quantity which tends to vary, for example voltage or current, is automatically maintained constant; and relates particularly to power operated controllers or regulators actuable by deviations of the electrical quantity from a predetermined value, and operating to counteract the tendency of the quantity to deviate from said value, to maintain it at said value.

The object of the invention is to provide an improved regulating or controlling apparatus of this general class having the following features, among others, which distinguish it from prior apparatus.

A continuously running motor supplies torque to a transmission which transmits the torque differentially to a torque developing element and a power output element. The amount of torque delivered at the output element is determined by the torque developed at the torque developing element, and the latter is determined by the effect of an electric winding of the transmission.

The winding is energized in correspondence with the electrical quantity to be regulated. The output element operates means to counteract the tendency of the electrical quantity to increase or decrease.

Among the advantages and improvements of such a regulator over prior regulators are that, the action to counteract deviation of the electrical quantity from the desired value, begins immediately when deviation in either sense begins, or tends to begin, because the power supplying motor is continuously running and no delay is introduced because of the time required to start or stop and reverse it; and because the rate at which the deviating quantity is returned or restored to the desired predetermined value when it starts to deviate, is directly commensurable with the extent of its deviation.

The regulation is exceedingly sensitive for a like reason, and hunting is obviated.

Other objects will be apparent to those skilled in the art to which the invention appertains.

The invention is fully disclosed in the following description taken in connection with the accompanying drawing, in which.

Figure 1:
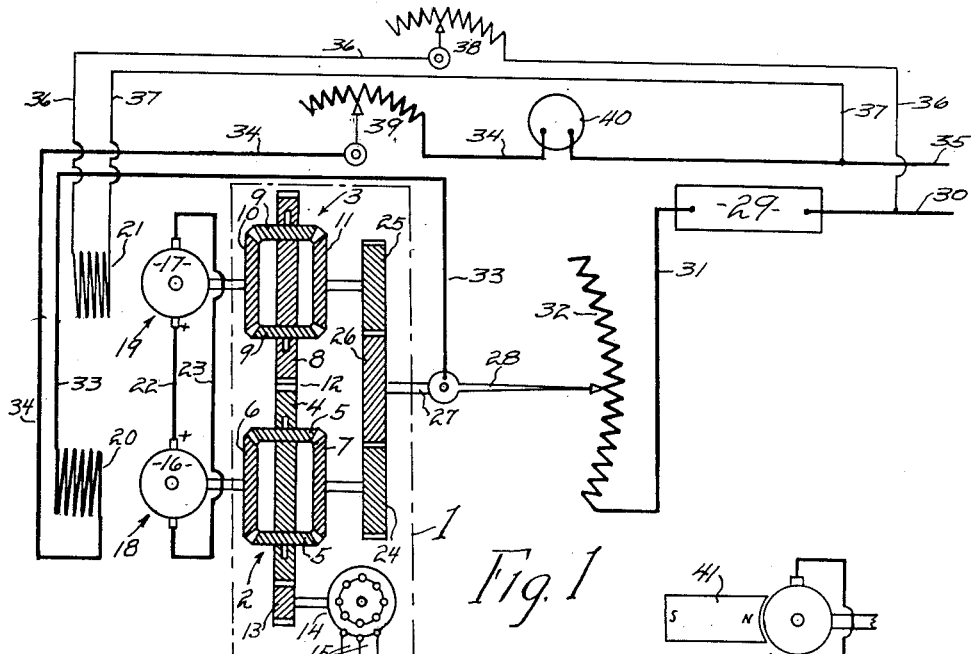
Fig. 1 is a diagrammatic view illustrating a regulator embodying the invention, in a form for regulating, to a constant value, the current flowing in a generalized work circuit; and utilizing double differential gearing as a part of a motor driven transmission, and a direct current control.

Referring to the drawing, Fig. 1, I have shown within the broken line rectangle 1, a transmission comprising two differential gearings 2 and 3.

The gearing 2 comprises a spider 4, rotatably supporting pinions 5—5, meshed with differential gears 6 and 7.

The gearing 3 comprises a spider 8 rotatably supporting pinions 9—9 meshed with differential gears 10 and 11.

The spiders have peripheral gear teeth mutually meshed at 12, and one of them, for example the spider 4, is meshed with a pinion 13 driven by a motor 14.

The motor 14, energized from mains 15 may be considered as continuously running and continuously driving the spiders 4—8 in opposite directions although of course a switch could be provided to cut the motor 14 off when the apparatus is not in use.

The gears 6 and 10 are connected to the rotors 16—17 of electric generators 18—19 driving them in opposite directions. The generators have fields 20—21 the windings only thereof being shown, and they are poled to cause the potentials at the brushes of the generators to be opposed as indicated.

The rotors 16—17 are connected in a local load circuit 22—23.

Preferably the gearing 2, and the generator 18 are like the gearing 3 and generator 19; so that for a certain degree of energization of the fields 20—21 at which the fields may be said to be balanced, the generators produce equal opposing output voltages and no current flows in the load circuit 22—23; and the torques on the generators are equal, and they rotate at the same speed; and if the field of one generator is energized more strongly than that of the other the potential of that generator will overcome that of the other generator and current will flow in the local circuit and drive the other generator as a motor.

When the fields 20—21 are balanced as aforesaid, very small equal and opposite torques are, as a consequence, developed at the generators 18—19 and at the gears 6—10, and equal and opposite torques are developed at the gears 7—11. The gears 7—11 are connected to gears 24—25 and communicate equal and opposite torques to them, and they in turn are both meshed with a gear 26, connected by an output shaft 27 to a regulating arm 28; but because the torques at the gears 24—25 are opposite and equal, they and the gears 7—11 remain at rest, and the arm 28 remains at rest; and the gears 6 and 10 and rotors 16 and 17 rotate, the latter in the direction of their respective spiders 4 and 8.

When the field of one generator, for example the field 20 of the generator 18 is made stronger than the other, electrical load develops at the generator 18 and it drives the generator 19 as a motor. The load on the generator 18 slows it down, and the action of the generator 19 as a motor speeds it up. The generator 18 slows down the gear 6 thereby starting up the gear 7 and the gear 24. The motor 19 speeds up and speeds up the gear 10 which starts up the gear 11 and the gear 25, in the same direction as the gears 7 and 24.

The gear 26 is thereby rotated by the gears 24 and 25 and rotates the arm 28 in a prescribed direction. The reverse would be true if the field 21 were made stronger than the field 20, or the field 20 were made weaker than the field 21; and the arm 28 would be moved in the reverse direction.

The net result is that the arm 28 will be rotated in one direction or the other as one field 20 or 21 is made stronger than the other.

In either case, one generator acts as a brake on the differential gearing, but the braking energy is not dissipated or lost, being converted into electrical energy in the circuit 22—23 and thence into mechanical energy in the other generator as a motor, and supplied thence back into the gearing system.

At 29 is indicated in diagrammatic or generalized manner an apparatus, circuit, process, etc. etc. to and through which electric load current flows from a supply main 30. It is the function of this embodiment of the invention to maintain this current at a constant value in spite of its tendency to deviate from that value because of whatever may be going on in the apparatus, circuit, process, etc. represented at 29.

The current flows from the apparatus 29 by a wire 31 through part of a resistor 32 to the arm 28 (the arm and resistor constituting a rheostat), thence by wire 33 to energize the field 20, thence by wire 34 to the other supply main 35.

The field 21 is energized in correspondence with the potential of the supply mains 30—35, being connected across them by wires 36—37; and which potential is presumed to be constant.

Manual rheostats 38 and 39 are provided in the line of the wires 36 and 34 respectively to adjust the energization of the field 21 and 20 relatively. An ammeter 40 indicates the current value being regulated.

In operation, with motor 14 running, and for any given value of the field 21, if the fields 20—21 are out of balance, because, say, the field 20 is stronger than the field 21, the arm 28 will rotate in the direction to cut more of the resistor 32 into the circuit, thereby reducing the current and also weakening the field 20 itself, and this goes on until a balance is reached as between the fields 20 and 21. (If the direction of movement of the arm 28 is opposite to that just mentioned, this is corrected once for all by reversing the direction of the motor 14.) If the current then flowing in the load 29, is indicated on the ammeter 40 is too small, the field 21 is adjusted at the rheostat 38 to strengthen it; and vice versa; until the correct or wanted or predetermined value flows.

Thereafter, any tendency for the current in the load 29, resistor 32 and field 20 to deviate from the predetermined value throws the fields 20—21 out of balance, and rotates the arm 28 in the direction to counteract the deviation and restore the predetermined value.

It will be understood that deviation in the direction to reduce the current will make the field 21 stronger than the field 20, and deviation to increase it will make the field 20 the stronger one.

Figure 1A:
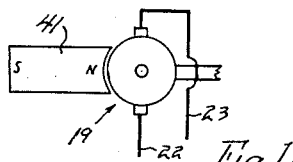
Fig. 1A is a fragmentary view of a part of Fig. 1, illustrating a modification.

As stated, it is presumed that the voltage of the main supply lines 30—35 is constant to maintain constant the effect of the field 21. In cases in which there is too much variation of this line potential, the modification of Fig. 1A may be utilized. Here a constant field for the generator 19 is provided by a permanent magnet 41.

When the rheostat 39 is manipulated, the current value will be changed and cause the arm 28 to move to a new position to restore the current value. By this means, the range of regulating movement of the arm 28 over the resistor 32 can be kept, in general, in the middle portion of the resistor, without liability that the arm will be moved beyond either end of the resistor during regulating movements thereof.

Figure 2:
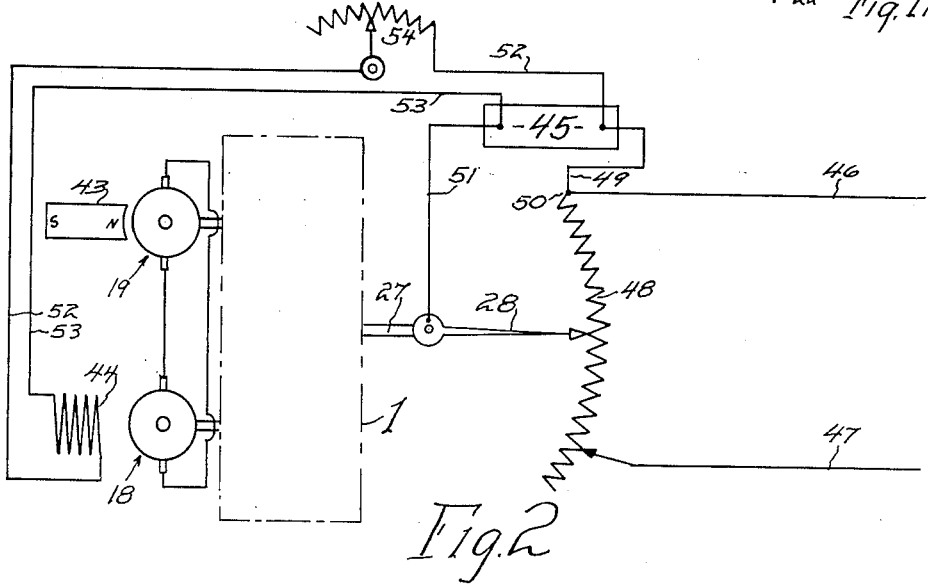
Fig. 2 is a view similar to Fig. 1 but for regulating the drop of potential in a generalized work circuit.

In the form of Fig. 2, the differential gearings 2—3 and driving motor 14 of Fig. 1 are utilized and to simplify the drawing are indicated by the broken line enclosure 1, reproduced from Fig. 1. The generators 18—19, output shaft 27, and arm 28 are reproduced from Fig. 1.

A permanent magnet 43 provides a constant field for the generator 19 and the generator 18 has a variable field as indicated at 44.

Here the invention is applied to regulate to a constant value, the potential drop across, or the potential impressed upon, a load 45, which as will now be apparent to be within the purview of the invention, may be any kind of a process, circuit, apparatus, etc.

A pair of supply mains 46—47 have a voltage divider resistor, or potentiometer type resistor, 48, across the mains 46—47.

The arm 28 contacts the resistor at an intermediate point and a potential wire 49 from one end 50 of the resistor to one side of the load 45, and a potential wire 51 from the arm 28 to the other side, impress upon the load the drop of potential in the resistor 48 occurring between the point 50 and the arm 28, and which is varied to regulate it by movement of the arm 28.

This potential is impressed upon the field 44 by wires 52—53 connected across the load 45.

The effectiveness of the field 44 relative to that produced by the magnet 43 may be adjusted by a rheostat 54, whereby the fields may be balanced at a desired or predetermined potential on the load 45 and corresponding energization of the field 44.

As described for Fig. 1, when the lower field (as viewed in the drawing) here 44, predominates over the upper field of the magnet 43, the arm 28 is moved upwardly; and vice versa.

Any increase in potential at the load 45 due to any cause, strengthens the field 44, disturbs the balance of the two fields, causes the arm 28 to move upwardly and cut out some of the resistance 48 and restores the balance of the fields and restores the potential to the desired value.

In the embodiments of Figs. 1 and 2, where a double differential gearing is employed, the effect of the upper field (as viewed in the drawing) tends to move the arm 28 clockwise; and the effect of the lower field tends to move it counterclockwise and is balanced against the constant effect of the upper field. The constant effect of the upper field is therefore properly considered as a constant biasing effect. This bias by the upper field becomes more readily apparent when it is realized that if the lower field be deenergized or weakened, the effect of the upper field being ever present will cause the arm 28 to be moved clockwise.

Figure 3:
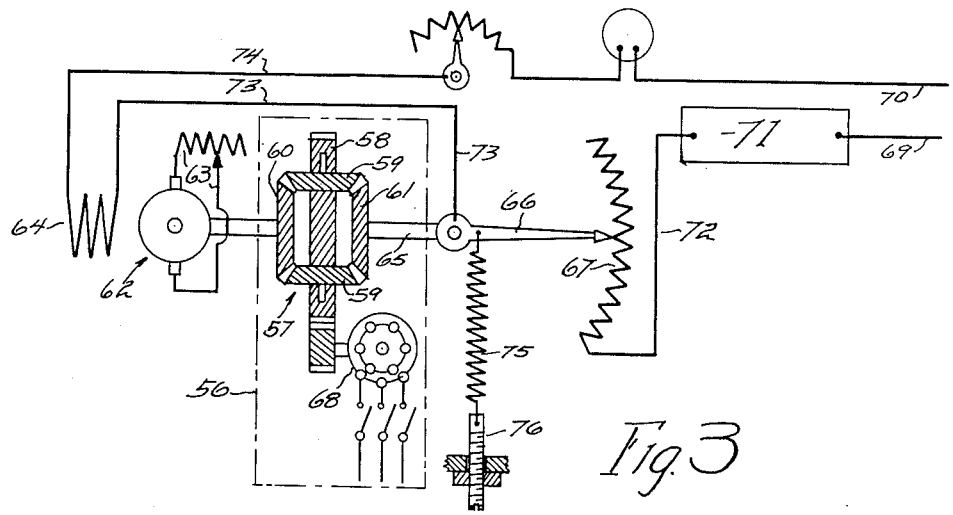
Figs. 3 and 4 are views similar to Figs. 1 and 2 respectively illustrating modifications in which a single differential gearing is utilized with direct current control.
Figure 4:
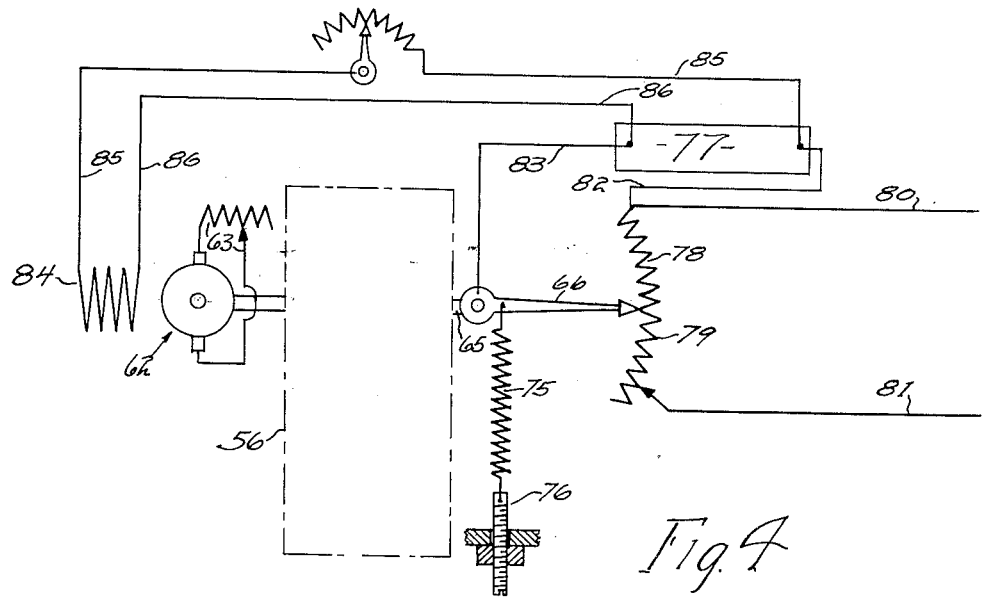

In the forms of Figs. 3 and 4, a single differential gearing is utilized and the effect of a single field is balanced against a constant bias in the form of a mechanical torque. The torque is preferably produced by a biasing spring and the effect of the field is balanced against the spring-produced torque bias. In Fig. 3, a transmission in the broken line rectangle 56 comprises a differential gearing 57 having a spider 58, pinion 59 and gears 60—61, the former driving a generator 62 having an adjustable load circuit 63 and a field identified by a winding 64. The gear 61 drives a load shaft 65 which moves an arm 66 over a rheostat resistor 67. A motor 68 continuously drives the spider 58.

Current is supplied from a supply main 69 through a load 71 by wire 72, resistance 67, arm 66, wire 73, winding 64, wire 74 to supply main 70.

An adjustable spring 75 connected at one end to the arm 66 exerts constant torque on the arm in the direction to cut out resistance 67; and is adjustable by a screw 76 at its other end.

The arrangement operates to maintain the current in the load 71 constant.

The effect of the desired predetermined current energizing field 64 is balanced against the spring 75 when the arm 66 is in a normal position.

If the current for any reason starts to change, for example starts to rise, it increases energization of the field 64, and increases the torque at the generator 62 and correspondingly at the gear 61 and arm 66 which latter overcomes the spring 75 and moves the arm 66 to cut in more resistance 67 until the corresponding reduced effect of the field 74 is again balanced by the bias of the spring 75.

The arrangement of Fig. 4 is similar to that of Fig. 3, but regulates to a constant value the potential across a load 77.

The potential drop through part 78 of a resistor 79 between supply lines 80—81 is supplied by a wire 82, and by the arm 66 and a wire 83, across the load 77.

The potential across the load energizes a field 84 by wires 85—86.

The transmission 56, the generator 62, arm 66, and spring 75 are reproduced in Fig. 4 from Fig. 3.

The effect of the field 84 is normally balanced against the bias of the spring 75, at a predetermined potential energizing the field 84. Upon a change of potential at the load 77, say an increase, the effect of the field 84 is increased and overpowers the spring 75 and moves the arm 66 toward the main 80 to reduce the impressed potential to weaken the field 84 to again reach a balance and restore the potential to its predetermined value.

Figure 5:
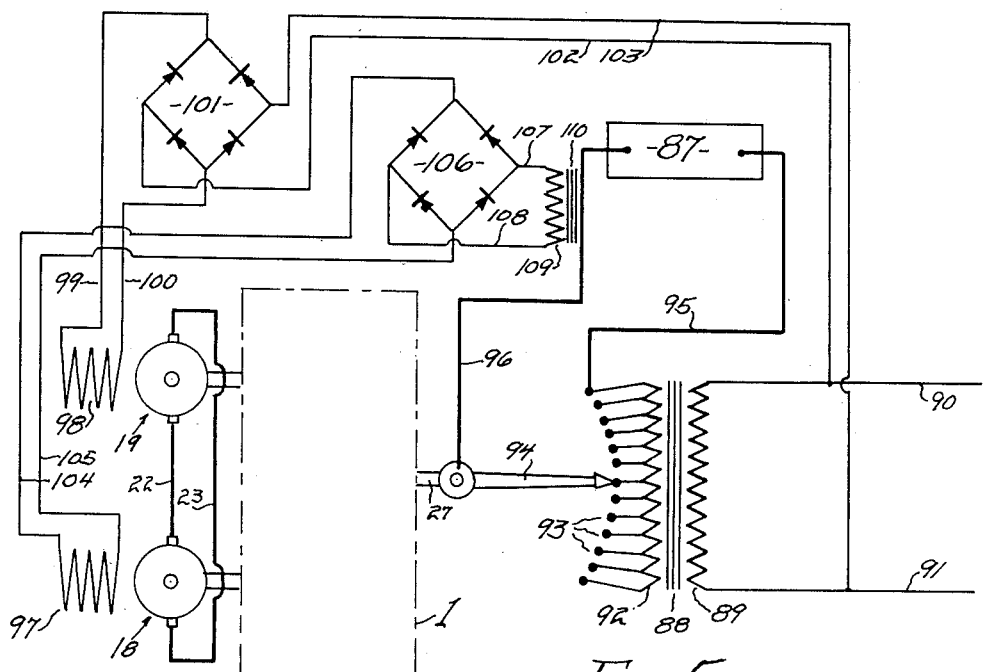
Figs. 5 and 6 are views similar to Figs. 1 and 2 respectively utilizing double differential gearing, and a direct current control, but for regulating alternating load current and alternating load potential respectively.
Figure 6:
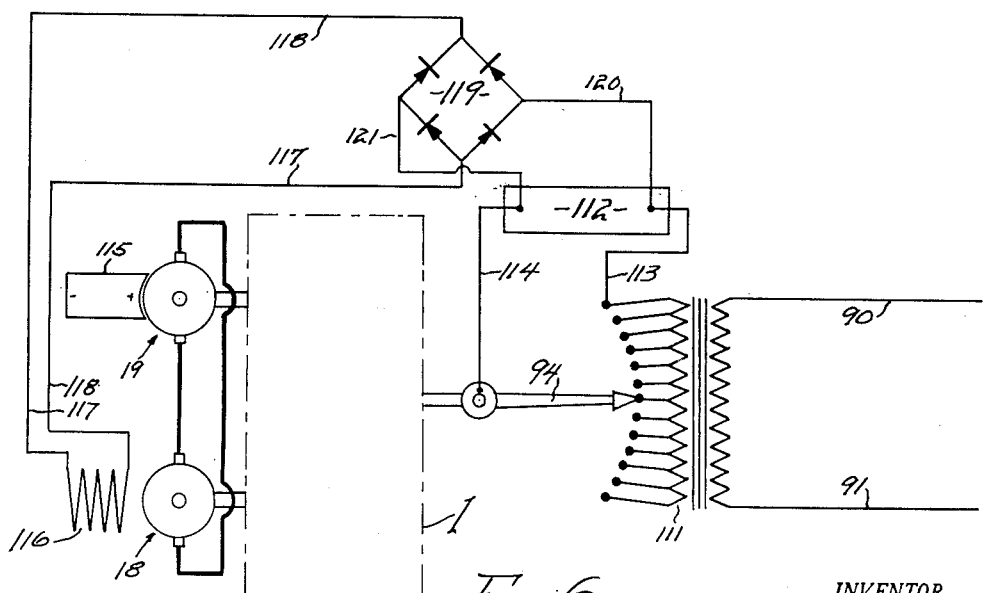
Figure 7:
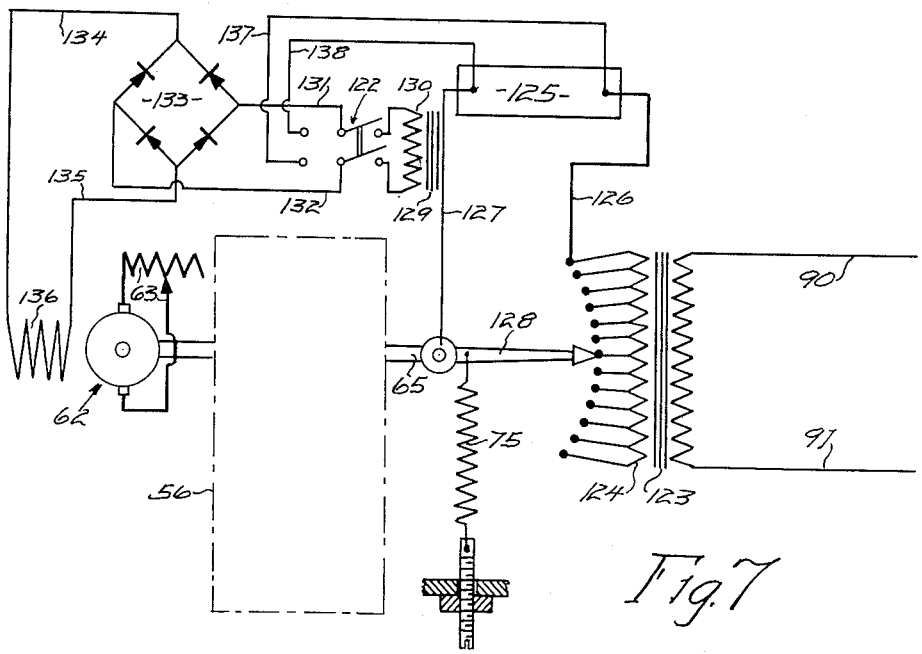
Fig. 7 is a combined view similar to Figs. 3 and 4 utilizing a single differential gearing and direct current control but for regulating either alternating current or alternating potential.

In the foregoing forms, Figs. 1 to 4, the system is for direct current. In Figs. 5, 6, and 7 are illustrated embodiments of the invention for uses where the load to be regulated is an alternating current load, but where it is desired to retain the advantages of direct current in the regulator parts.

A brief description will suffice for these and following forms, in view of the more detailed description of preceding forms.

Fig. 5 regulates to constant value the current in a load 87.

A transformer 88 has its primary 89 energized across alternating current mains 90—91; and its secondary 92 has a number of tap connections 93—93 engageable successively by an arm 94 movable thereover. More or less of the secondary 92 is connected in series with the load 87 by a wire 95, and by the arm 94 and a wire 96.

Reproduced from Fig. 1 are the double differential transmission 1, and the two generators 18—19, their load circuit 22—23, and the output shaft 27 to operate the arm 94.

Fields 97—98 for the generators 18—19 are energized with rectified alternating current, the field 98 being supplied by wires 99—100 from a rectifier loop 101, connected across the alternating current mains 90—91 by wires 102—103.

The field 97 is energized by wires 104—105 connected to a rectifier loop 106 which is energized by wires 107—108 from the secondary 109 of a current transformer 110 in the line of the series load wire 96.

The field 97 is thus energized proportionally to the load current and its effect is balanced against the bias of the field 98, to cause the arm 94 to take up positions at which the current in the load 87 is constant.

In Fig. 6, similar to Fig. 5, having the double differential transmission 1 and the two generators 18 and 19 impresses the potential of a transformer secondary 111 upon a load 112 by a wire 113 and by the arm 94 and a wire 114.

The generator 19 has a constant biasing field provided by a permanent magnet 115.

The field 116 of the generator 18 is energized by wires 117—118 from a rectifier loop 119 which is connected by wires 120—121 across the load 112.

The field 116 is thus energized proportionally to the potential across the load, and its effect is balanced against the effect of the field 115 to cause the arm 94 to take up positions at which the potential on the load is constant.

In Fig. 7, a form is illustrated utilizing a single differential transmission 56, a generator 62 having a load circuit 63 and an output shaft 65 reproduced from Fig. 3, and for simplification of the drawings, a throw-over switch at 122 is provided by which the system can be converted from one illustrating regulation to constant current, to one illustrating regulation to constant potential.

With the switch 122 thrown to the right as viewed in the drawing, the transformer 123 supplies current from its secondary 124 to a load 125 by wire 126 and thence by wire 127 to the arm 128, which is biased by the adjustable spring 75.

A current transformer 129 in the line of the wire 127 supplies current from its secondary 130 through the switch 122 to wires 131—132 to a rectifier loop 133, which by wires 134—135 energizes the field 136 of the generator 62, proportionally to the current in the load 125.

The effect of the field 136 is balanced against the spring 75 at a predetermined value of current in the load 125 to maintain the load current constant.

With the switch 122 thrown to the left, the rectifier is energized from the potential across the load 125, by wires 137—138 and 131—132, and the field 136 therefore is energized proportionally to that potential. The potential impressed on the load 125 is supplied from the transformer secondary 124 by wire 126 and by wire 127 and arm 128. The system then operates to balance the effect of the field 136 against the bias of the spring 75 to maintain the load potential constant.

Figure 8:
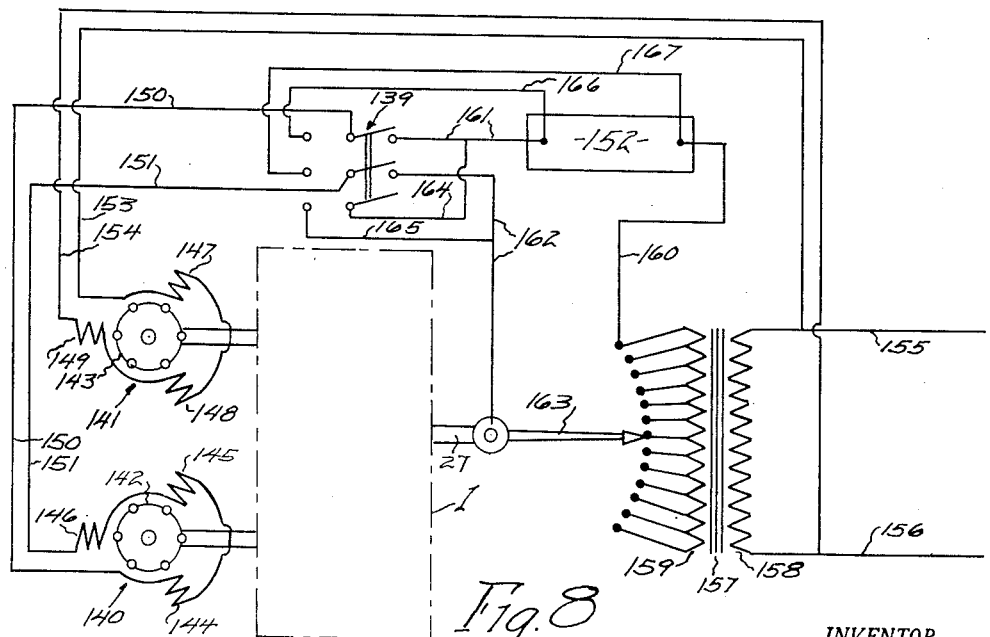
Fig. 8 is a combined view similar to Figs. 1 and 2 utilizing double differential gearing, but with alternating current control for regulating either alternating current or alternating potential.
Figure 9:
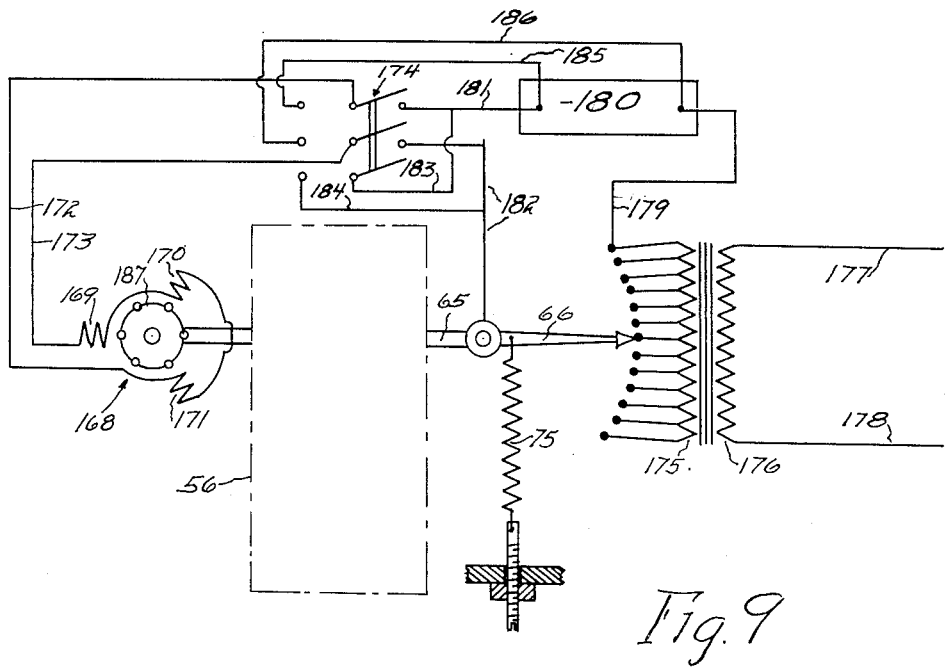
Fig. 9 is a combined view similar to Figs. 3 and 4 utilizing a single differential gearing, but with alternating current control, for regulating either alternating current or alternating potential.

In Figs. 8 and 9 are illustrated embodiments of the invention for uses where the load to be regulated is an alternating current load, and where it is desired to eliminate rectification and to have the advantages of using alternating current generators in the regulator parts.

In Fig. 8, for simplification, there is a throw-over switch 139 by which the system can be changed from one illustrating constant current regulation to one illustrating constant potential regulation.

A double differential gearing transmission 1, having an output shaft 27, is reproduced from Fig. 1 and two generators 140—141 to be described are associated therewith corresponding to the generators 18 and 19 of Fig. 1.

The generators 140—141 have the construction of squirrel cage induction motors comprising rotors 142—143, and polyphase (in this illustrative example, three phase) stator windings 144—145—146 and 147—148—149, but the stator windings in each stator are connected in series as shown.

At the motor 140, the field 144—145—146 is connected by mains 150—151 to the switch 139 whereby in a manner to be described the field may be energized with alternating current or alternating potential at a load 152.

At the motor 141, the field 147—148—149 is connected by mains 153—154 across alternating current supply mains 155—156.

With the switch 139 thrown to the right, a transformer 157 having a primary 158 across the mains 155—156 supplies current from its secondary 159 by wire 160 to and through the load 152, thence by wire 161 through the switch 139 to main 150, through the field 144—145—146, by wire 151 to the switch 139, and by wire 162 to arm 163.

Torque to drive the generator 140 varies with tendency of the load current to vary and is balanced against the constant biasing torque to drive the generator 141, and the arm 163 is moved to maintain the balance and maintain the load current constant.

When the switch 139 is thrown to the left, potential of the secondary 159 is impressed upon the load 152 by wire 160, and by wire 161, a wire 164, switch 139, a wire 165, wire 162, and arm 163; and the potential across the load 152 energizes the field of the motor 140, being connected to its main 150 by a wire 166 and switch 139 and to its main 151 by a wire 167 and switch 139. The torque of the generator 140 is thus made proportional to the potential across the load and is balanced against the biasing torque of the generator 141 to maintain the load potential constant.

In this connection, the conditions at the load 152, and the character of the load, are assumed to be such that while the potential supplied to the generalized load circuit as a whole may be constant for any given position of the arm 163, due to constant voltage of the mains 155—156, the potential drop in the actual load, or part of the load circuit here considered as the load 152, may vary, and to keep it constant regulation is necessary.

As to the generators 140—141, it is known that when the stator windings of an induction motor are connected to a source of alternating current, and the rotor is driven above the synchronous speed of the stator, the motor becomes a generator; and the mains supplying exciting current to the stator field function also as the load circuit mains of the generator conducting alternating load current from the generator and supplying it back to the alternating current source. The exciting current is out of phase with the generated current, so that both flow over the same mains; and an angle of displacement between them automatically occurs due to electrical conditions inherent in such an arrangement.

In Fig. 9, a single differential gearing transmission 56, output shaft 65, arm 66 and biasing spring 75, are reproduced from Fig. 3; and the transmission drives a generator 168 of the type described for Fig. 8 comprising a rotor 187 and polyphase field windings 169—170—171 connected in series across mains 172—173.

By means of a throw-over switch 174, the figure illustrates both constant current regulation and constant potential regulation.

With the switch 174 thrown to the right, current from a transformer secondary 175, induced by a primary 176 connected across mains 177—178 is supplied by a wire 179 to a load 180, thence by wire 181, switch 174, wire 172, field 169—170—171, wire 173, switch 174, and a wire 182 to arm 66.

The torque of the generator 168 due to variations of current in the load 180 is balanced against the constant bias torque of the spring 75, and the load current is maintained constant.

With the switch 174 thrown to the left, potential of the transformer secondary is impressed on the circuit or apparatus comprising the load 180, by wire 179 and by wire 181, a wire 183, switch 174, a wire 184, wire 182, and arm 66.

The potential drop across the load 180 energizes the field 169—170—171, being connected to the field main 172 by a wire 185, through switch 174, and to the field main 173, by a wire 186, through the switch 174.

The torque of the generator 168 due to variations of potential drop in the load 180 is now balanced against the constant bias torque of the spring 75 and the potential drop is maintained constant.

I claim:

1. In an electrical regulating apparatus for regulating to substantially a predetermined value an electrical quantity of an electric circuit, a regulator connected to the circuit and comprising an alternately movable regulator part effective to respectively increase and decrease the electrical quantity of the circuit by its alternate movement; a power transmission of the differential gearing type, comprising a rotary power input part adapted to be connected to and continuously driven at substantially constant speed by a rotary power source; and comprising a rotary output element, and two rotary torque developing elements to which elements input torque from the power source is differentially transmitted; the rotary torque developing elements being in the form of electric generators having electric load circuits and magnetic fields and developing torque to resist being rotated commensurable with the strengths of their fields, and one having a field of substantially constant strength and the other energized by a winding and of strength commensurable with its energization; the transmission applying a biasing torque from the output element to the regulator part commensurable with the torque developed by the one generator tending to move the regulator part in one direction; and the transmission applying variable torque from the output element to the regulator part commensurable with the torque developed by the other generator tending to move the regulator part in the other direction; the said field winding of the other generator being connected to be energized commensurably with the said electrical quantity; and the transmission responding to energization of the field winding to effect a balance between said applied torques at a predetermined value of said electrical quantity.

2. In an electrical regulating apparatus for regulating to substantially a predetermined value an electrical quantity of an electric circuit; a power transmission comprising two, three-gear-element differential gearings; one element of each gearing adapted to be continuously driven by a rotary power source at substantially constant speed; another element of each gearing being connected to a rotary power output element; the third element of each gearing connected to a rotary torque-developing generator having an energizing field and a load circuit; means maintaining one field substantially constant; circuit means energizing the other field in correspondence with values of said electrical quantity; the transmission responding to the predetermined value of the electrical quantity or deviations therefrom to maintain the output element at rest or to rotate it in alternate direction due to the torques of the generators being balanced or one predominating over the other, as the predetermined value of the electrical quantity or deviations therefrom effects balance or unbalance of the generator fields; an alternately movable regulator element and means controlled by its alternate movements to increase and decrease the electrical quantity; and means communicating movements of the output element to the regulator element.

3. The regulating apparatus described in claim 1 and in which the electric circuit whose electrical quantity is to be regulated, is an alternating current circuit; and in which the electric generators have the construction of polyphase squirrel cage induction motors, and the input torque is differentially transmitted to their rotors; and the polyphase stator windings of each are connected in series; and the windings of one generator are energized with alternating current at substantially constant value, and the windings of the other generator are energized with alternating current commensurably with the said electrical quantity.

LEV A. TROFIMOV.

REFERENCES CITED

The following references are of record in the file of this patent:

UNITED STATES PATENTS

| Number | Name | Date |
|---|---|---|
| 1,299,509 | Rey | Apr. 8, 1919 |
| 1,832,822 | Thompson | Nov. 17, 1931 |
| 1,834,134 | Paschen | Dec. 1, 1931 |
| 1,994,324 | Suits | Mar. 12, 1935 |
| 2,384,776 | Trofimov | Sept. 11, 1945 |
| 2,421,560 | Haynes | June 3, 1947 |
| 2,445,342 | Trofimov | July 20, 1948 |